United States Patent
Dengler et al.

(10) Patent No.: US 7,984,424 B2
(45) Date of Patent: Jul. 19, 2011

(54) ISOLATING DECLARATIVE CODE TO PRESERVE CUSTOMIZATIONS

(75) Inventors: Patrick Michael Dengler, Redmond, WA (US); Sripriya Prashanthi Vasudevan, Redmond, WA (US); Goksel Genc, Bellevue, WA (US); Rachna Vargiya, Redmond, WA (US); Eray Aydin, Bellevue, WA (US); Lawrence M. Sanchez, II, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1179 days.

(21) Appl. No.: 11/511,637

(22) Filed: Aug. 29, 2006

(65) Prior Publication Data

US 2006/0294506 A1    Dec. 28, 2006

(51) Int. Cl.
    G06F 9/44        (2006.01)
(52) U.S. Cl. ...................................................... 717/120
(58) Field of Classification Search ........... 717/120–122
    See application file for complete search history.

(56) References Cited

U.S. PATENT DOCUMENTS

| | | | | |
|---|---|---|---|---|
| 4,558,413 A | 12/1985 | Schmidt et al. | ............... | 707/203 |
| 5,822,771 A | 10/1998 | Akayama et al. | ............. | 711/162 |
| 6,381,742 B2 | 4/2002 | Forbes et al. | ................. | 717/176 |
| 6,711,557 B1 | 3/2004 | Palaniappan | ..................... | 706/45 |
| 6,904,588 B2 | 6/2005 | Reddy et al. | ................... | 717/104 |
| 7,127,320 B1 | 10/2006 | Brown et al. | ................... | 700/121 |
| 7,127,705 B2 | 10/2006 | Christfort et al. | ............. | 717/113 |
| 7,188,332 B2 | 3/2007 | Charisius et al. | ............. | 717/104 |
| 7,194,730 B2 | 3/2007 | Pramberger | ................... | 717/120 |
| 7,676,790 B1 * | 3/2010 | Hsu et al. | ...................... | 717/106 |
| 2002/0010867 A1 * | 1/2002 | Schaefer et al. | ............... | 713/201 |
| 2003/0188160 A1 * | 10/2003 | Sunder et al. | ................. | 713/165 |
| 2003/0217332 A1 * | 11/2003 | Smith et al. | .................... | 715/513 |
| 2004/0064480 A1 * | 4/2004 | Bartlett et al. | ............. | 707/104.1 |
| 2005/0138347 A1 * | 6/2005 | Haverkamp et al. | ............. | 713/2 |
| 2007/0067467 A1 * | 3/2007 | Kennedy et al. | ............. | 709/229 |
| 2008/0263350 A1 * | 10/2008 | Haverkamp et al. | ............. | 713/2 |

OTHER PUBLICATIONS

U.S. Appl. No. 10/999,312, filed Nov. 30, 2004, entitled "System and Apparatus for Software Versioning", Inventor: Burugapalli.
U.S. Office Action dated Sep. 25, 2007 cited in U.S. Appl. No. 10/999,312, (15 pages).

* cited by examiner

*Primary Examiner* — Anna Deng
(74) *Attorney, Agent, or Firm* — Merchant & Gould

(57) ABSTRACT

Embodiments provide a software model which allows a user to modify a software program in substantially the same manner as the original programmer or developer. In one embodiment, declarative code and user customizations are isolated from other code and structure of the software program. The isolated customizations can be quickly and efficiently examined to determine whether any changes or other modifications have been made to the software program. Additionally, the isolated changes can be efficiently located and applied when updating or upgrading the software program to persist any customized changes made to the software program.

18 Claims, 5 Drawing Sheets

ISOLATING DECLARATIVE CODE TO PRESERVE CUSTOMIZATIONS

RELATED APPLICATIONS

This application is related to U.S. patent application Ser. No. 10/999,312, filed Nov. 30, 2004, and entitled, "System and Apparatus for Software Versioning," which is hereby incorporated by reference in its entirety.

BACKGROUND

Developer applications, e-mail applications, word processing applications, browser applications, etc. are relied upon to communicate and process information. Many application users like to tailor or customize their applications according to habit, preference, and other needs. For example, many applications allow a user to tailor the interface according to particular preferences, such as by adding macros, modifying forms, using a certain font, etc. However, the personalized customizations are usually lost or overwritten once an application is upgraded to a new version or otherwise updated. This can be a very frustrating experience, since the user has to start over from scratch to recreate the lost customizations.

In a corresponding manner, developers and programmers attempt to customize applications to operate in a certain environment or under certain conditions and/or constraints. However, each application is typically integrally coupled to a proprietary customization procedure. The proprietary procedures provide a substantial impediment for users who like to implement their own customizations. The procedures are essentially "locked away" requiring support to implement any customizations from a limited number of software service sources.

In some cases, a provider can ship source code or build proprietary declarative models to allow a certain level of user customization. The former can cause many problems and it becomes virtually impossible to upgrade without months of preparation and days of downtime. The latter implies a proprietary model of metadata which forces the application developer to build their own tools, debuggers, run-times and models. In current applications, it is uncommon for a provider to ship a proprietary metadata model with an application. Many providers treat these metadata models as a company or trade secret. Like other company secrets, a provider's metadata model can be more valuable if not shared with the end-user or general public.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments provide an extensible software application or program including a development component and a declarative model. Subsequent users can use the development component and declarative model to build upon and customize the extensible software program. By using the development component and a declarative model, a user, such as a developer or programmer for example, does not have to create new models and other tools to customize the software program. The development component and declarative model are configured to preserve the user experience (e.g. providing toolsets, debuggers, compiles, deployments, etc.) by isolating the customizations including marking malleable or customizable bits.

These and other features and advantages will be apparent from a reading of the following detailed description and a review of the associated drawings. It is to be understood that both the foregoing general description and the following detailed description are explanatory only and are not restrictive of the invention as claimed.

DETAILED DESCRIPTION

Embodiments provide a software model which allows a user to modify a program in substantially the same manner as the original programmer or developer. In one embodiment, declarative code and user customizations are isolated from other code and structure. The isolated customizations can be quickly and efficiently examined to determine whether any changes or other modifications have been made to the software program. Additionally, the isolated changes can be efficiently located and re-applied when updating or upgrading the software program to persist any customized changes made to the software program.

Figure 1:
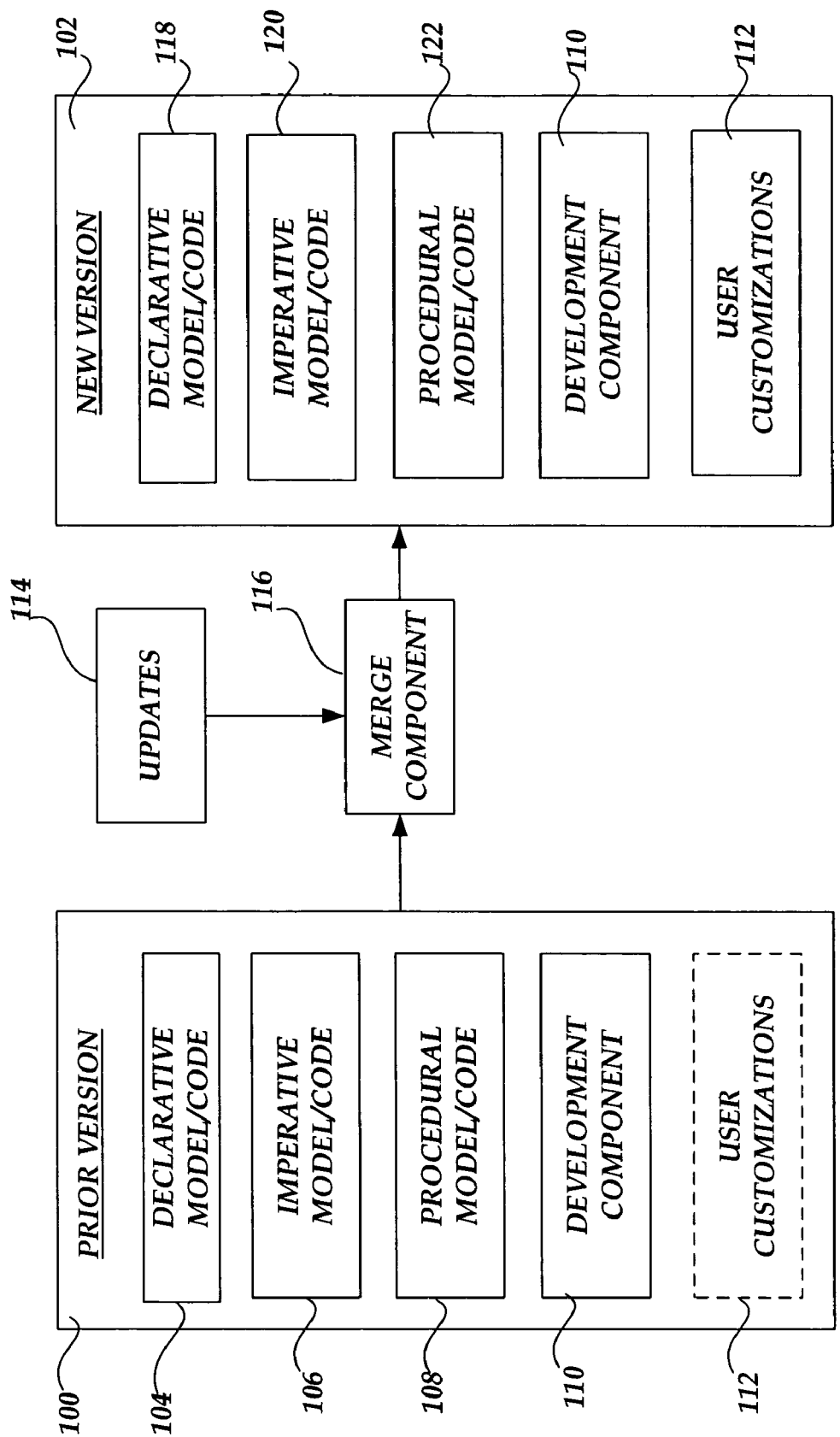
FIG. 1 is a block diagram depicting a prior version and a new version of a software package, including a merge component.

FIG. 1 is a diagram of a prior version 100 and a new version 102 of a software package. The prior version 100 of the software package may be an original release, an update since the original release, a patched version, etc. The new version 102 of the software package is a version subsequent to the prior version 100. The software packages may include one or more software files including, but not limited to: dynamic link library (DLL) files, shared object files, embedded software components, firmware files, executable files, data files, system configuration files, etc. While various aspects are shown with respect to the prior version 100 and new version 102 of FIG. 1, other implementations are available.

As shown in FIG. 1, the prior version 100 of the software package includes a declarative model/code 104, an imperative model/code 106, a procedural model/code 108, and a development component 110. Generally, the declarative model/code 104 may be described as a relational or a functional language to describe relationships between variables in terms of functions. The declarative model/code 104 includes a meta-data model. For example, meta-data model can include information of elements or attributes (e.g. name, size, data type, etc), records, data structures (e.g. length, fields, columns, etc), other data (e.g. location, associations, ownership, etc.), and/or descriptive information about the context, quality, condition, and/or characteristics of data.

In an embodiment, the declarative model/code 104 is isolated from the other code (see FIG. 1). That is, declarative model/code 104 and meta-data can be put into a separate project/assembly (e.g. work flow, schema, user interface, etc.)

and shipped to the end users. Stated another way, the declarative model/code 104 and associated meta-data is isolated rather than being integrated with the rest of assembled code. The isolated declarative model/code 104 and meta-data is included in the software package, allowing for interaction by the end user. In an alternative embodiment, a separate project can be created and/or isolated for one or more aspects of the declarative code based on a particular implementation. For example, an applet can be included with the software package and used to identify particular portions of the declarative code for isolation to thereby allow subsequent manipulation by an end-user. Accordingly, using the various embodiments described herein, an end user is able to customize a software package in substantially the same way as the original developer or programmer.

With continuing reference to FIG. 1, the imperative model/code 106 and/or procedural model/code 108 represent a generally unchanging set of code (e.g. a help engine, a file engine, etc.). Imperative code generally refers to code that specifies explicit manipulation of the state of a computer system. Procedural code generally refers to code that specifies an explicit sequence of steps that produce a specific result. End users are not generally given access to modify the imperative model/code 106 and/or procedural model/code 108, due to the inherent dependencies therein.

However, the development component 110 and declarative model/code 104 are configured to allow a user to make customizations 112 which persist in the new version 102, as described below. The customizations can be isolated for ready identification (e.g. delta/difference comparisons) when updating the software package. Furthermore, a standard or consistent set of development tools (e.g. development component 110) remain valid and workable by isolating user changes in declarative code, such as user customizations to a software package.

The user customizations 112 are shown in a dashed box of the prior version 100 which illustrates that the customizations may not have been implemented by the user as of yet. In one embodiment, the base development component 110 does not change from version to version. However, the development component 110 can be updated to include additional functionality and other tools. Thus, the base development component 110 provides a standard tool set for users (for example developers and programmers) to make desired customizations. As a consequence, the user does not have to rely on an outside source or vendor to implement customizations. Moreover, the user has an enhanced experience with each version due to the ease of making and persisting customizations using the development component 110.

With continuing reference to FIG. 1, one or more updates 114 can be merged with the prior version 100 to provide the new version 102 using the merge component 116. Upon upgrade or update of the prior version 100, the merge component 116 can recognize and merge changes (e.g. XML changes) of the declarative code including the meta-data between the prior version 100 and the update 114, to obtain the new version 102. The merge component 116 includes functionality and is configured to merge the declarative code 104, including the isolated customizations 112 made by the user. The resulting merge using the merge component 116 operates to persist user customizations and other changes in the now updated software package. That is, the user's customizations are available to the user in the updated version and the user does not have to re-engineer the customizations.

In an embodiment, the merge component 116 is configured to use the original software package and the customized package to determine a delta or difference of any changes between the original and customized versions. The delta or difference is then applied by the merge component 116 to obtain the updated version of the software package. In an embodiment, the delta is applied in an add/update/remove methodology to preserve XML strings and the semantic nature of the declarative code 104 and/or customizations 112. That is, the merge component 116 is configured to recognize the semantic meaning, in order, in sequence, and in parent-child relationships, of the update(s), declarative code 104, and/or customizations 112. The updating or upgrading can occur locally, remotely, or in some combination thereof.

Generally an XML diff utility can be used to determine differences between two XML versions by comparing an original XML version with a modified XML version. The XML diff utility generates an output that identifies differences at various nodes. The output generated by applying the XML diff utility may be in XML diff language (XDL), which describes differences between two versions. An output of XML diff utility is also known as XDL diffgram or just diffgram, and is a structured tree of changes that should be applied to various nodes of the original XML version in order to get the modified XML version.

Once updated, the new version 102 of the software package includes a declarative model/code 118, imperative model/code 120, procedural model/code 122, development component 110, and the user customizations 112. In other embodiments, the declarative model/code 104, imperative model/code 106, and procedural model/code 108 of the new version 102 are not significantly different from the declarative model/code 118, imperative model/code 120, and procedural model/code 122 of the prior version 100. In other embodiments, the one or more updates 114 include additional functionality for updating the development component 110 and other code.

Figure 2:
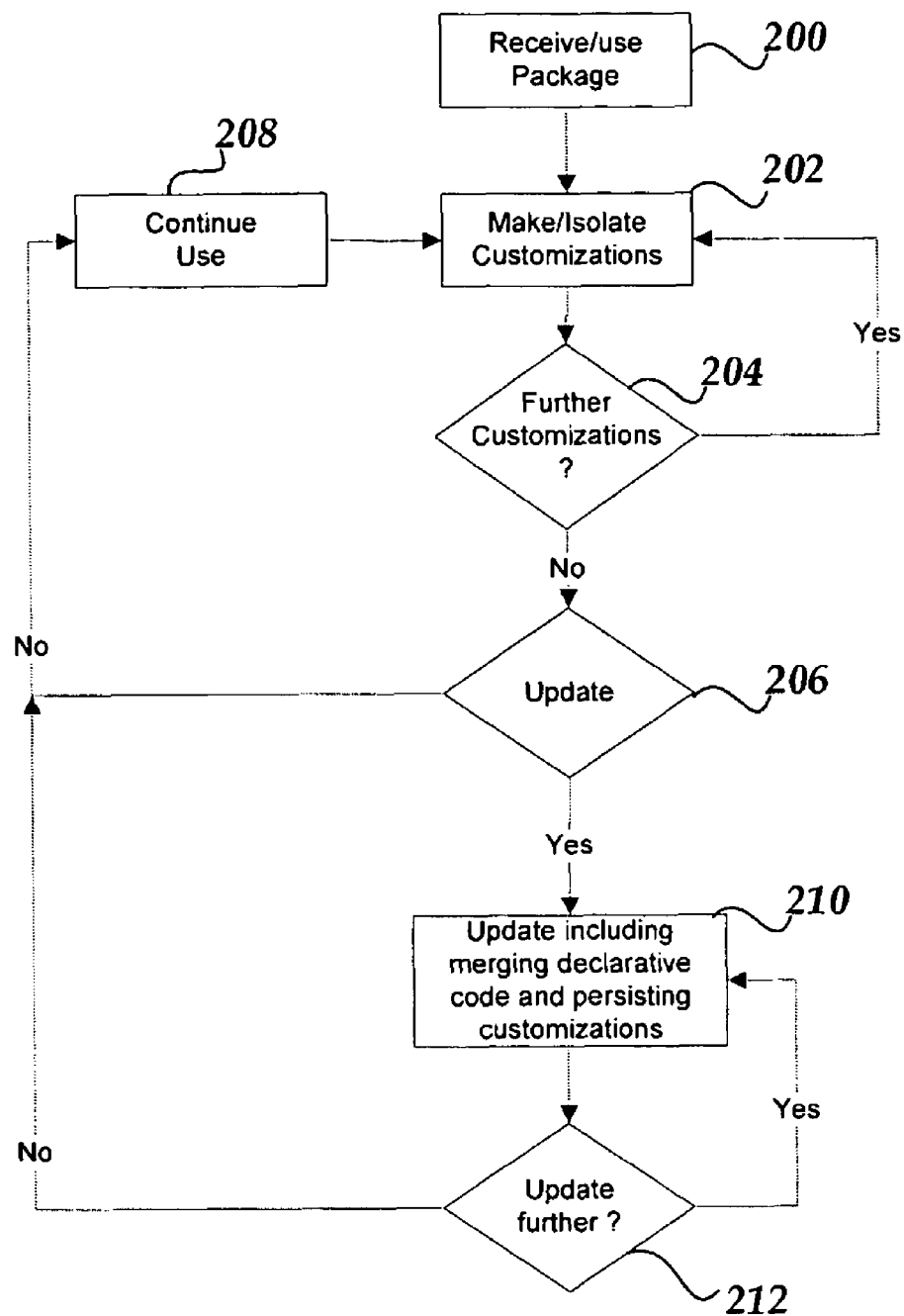
FIG. 2 is a flow chart of a procedure for persisting user customizations in a software package.

Referring now to FIG. 2, a flow chart of a procedure for persisting user customizations in a software package using the features depicted in FIG. 1 is shown. As shown in FIG. 2, a user receives and uses a software package at 200. For example, a developer may request and download a development program, such as VISUAL STUDIO by MICROSOFT, for use in developing one or more tailored applications. At 202, the user makes one or more customizations to the software package using the development component 110 (e.g. the same tool(s) as the original vendor). At 204, if the user wants further customizations, the flow returns to 202, where the user can make additional customizations to the software package.

If the user does not require further customizations at 204, the flow proceeds to 206. At 206, an update to the software package is available and the user has the option of updating the software package, such as updating to a new version, upgrading, or installing a patch for example. If the user does not want to upgrade at this time, the flow proceeds to 208 and the user continues using the software package. If the user does want to update at 206, the flow proceeds to 210 and the merge component 116 is used to merge the update(s) 114 with the current software package. Once the updates are complete at 212 (e.g. recompiled and redeployed), the user has the option of further updating the software package at 212. If the user would like to update further, then the flow returns to 210. If the user does not require further updates, the flow proceeds to 208 and the user can continue using the now updated software package.

Figure 3:
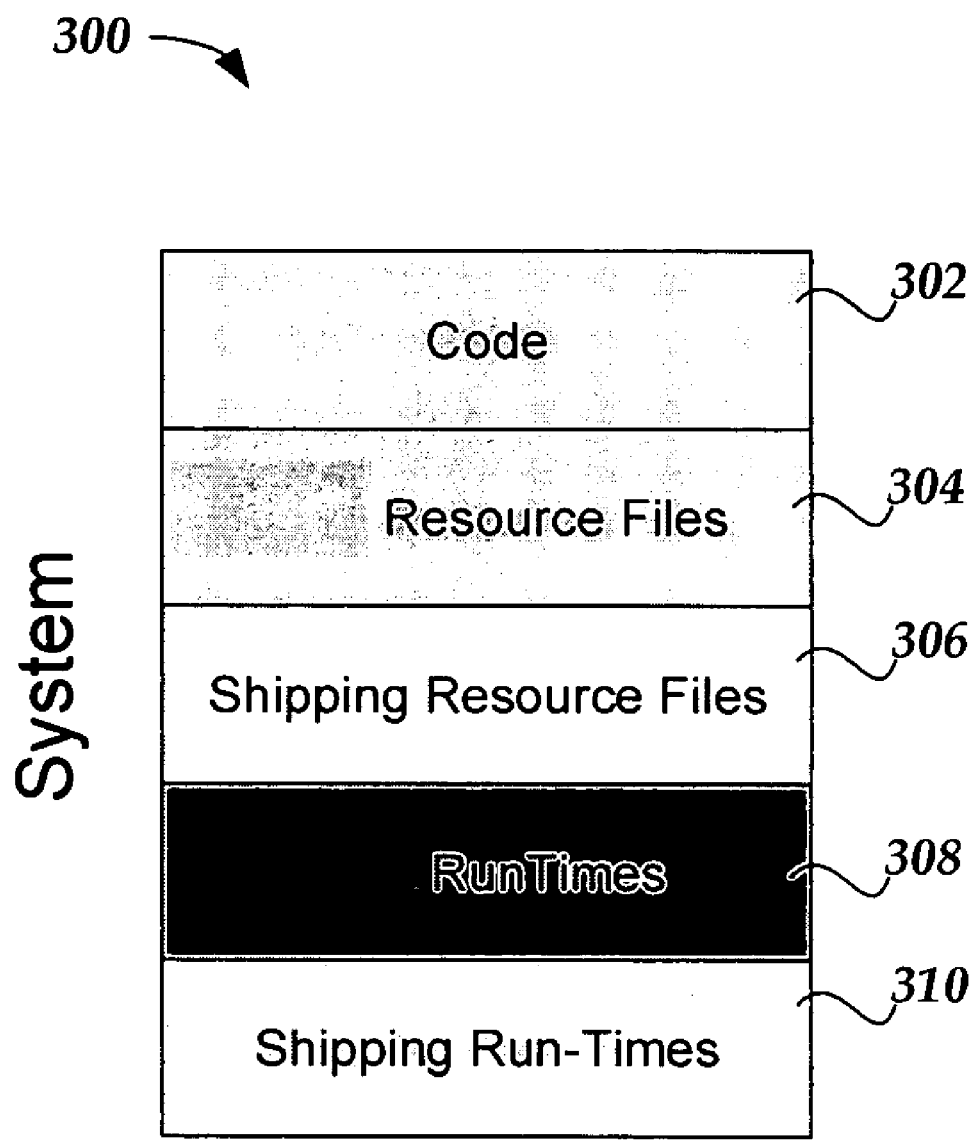
FIG. 3 depicts a system configured to isolate user customizations.

FIG. 3 depicts a system 300 configured to isolate user customizations in accordance with an embodiment. As shown in FIG. 3, the components of the system 300 are isolated from one another. That is, the system 300 includes a number of disparate components which are isolated from one another according to a particular functionality. The system 300 includes a code portion 302, one or more resource files 304, one or more shipping resource files 306, a run-times portion 308, and a shipping run-times portion 310.

For example, the one or more resource files 304 may include OFFICE business applications context meta-data. The one or more shipping resource files 306 may include shipping meta-data resource files, such as XAML, XOML, WSDL, XSD, etc. The run-times portion 308 may include OFFICE business applications run-times, such as Boostrapper, OUTLOOK item sync, correlation, Context mapper, etc. The shipping run-times portion 310 may include .NET, SQL Server, WF engine, etc. It should be noted that some meta-data resources are used at design time, while other meta-data resources are used at run-time. The decision as to whether or not the meta-data resources at run-time are compiled into an intermediate language (IL) can be implemented according to preference.

Figure 4:
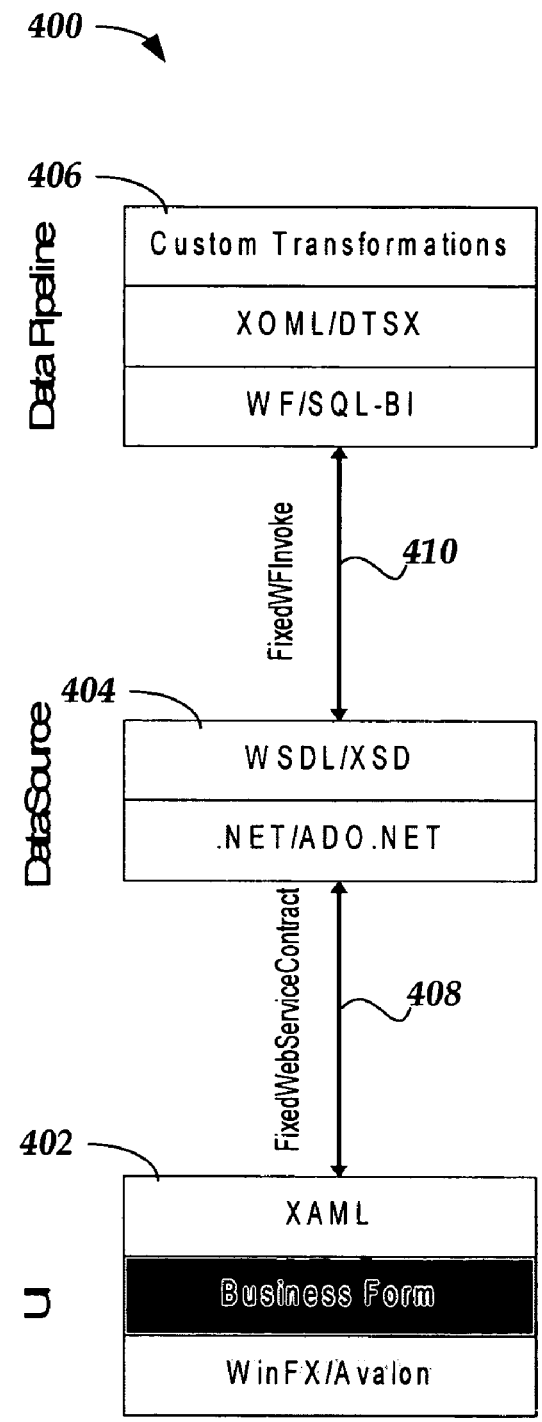
FIG. 4 is a functional block diagram which illustrates a system configured to isolate user customizations.

FIG. 4 is a functional block diagram which illustrates a system 400 configured to isolate user customizations, according to an embodiment. The system 400 includes a number of disparate components which are isolated from one another according to a particular functionality. As shown in FIG. 4, the system includes a user interface component 402, a data source component 404, and a data pipeline component 406, but is not so limited. The various components communicate with one another via configured communication channels 408 and 410.

Isolation of the components occurs in part due to communication channels 408 and 410. Communication between the user interface component 402 and the data source component 404 occurs via communication channel 408. Communication between the data source component 404 and the data pipeline component 406 occurs via communication channel 410. In one embodiment, the components of the system 400 can be isolated from one another using fixed contracts or rules for the communication channels 408 and 410 between the respective components. The fixed contracts improve the isolation between the various components of the system 400. For example, a fixed contract between the user interface component 402 and the data source component 404 can be a fixed signature on a web service. Correspondingly, a fixed contract between the data source component 404 and the data pipeline component 406 can be a WF activity.

It should be noted that all components of the system 400 are not necessarily required in every implementation. The user interface component 402 may require extra run-time code (e.g. custom controls perhaps). On the other hand, the data source component 404 can use existing run-times and design times for example. Using the system 400, many degrees of customization can occur within each component independent of the others. That is, details of the sources in the data pipeline component 406 do not add complexities to the user interface component 402 because they are isolated in the data pipeline component 406. Details of the sources in the data source component 404 do not add complexities to the user interface component 402 because they are isolated in the data source component 404. Similarly, details of the sources in the data pipeline component 406 do not add complexities to the data source component 404 because they are isolated in the data pipeline component 406.

The embodiments described herein are configured to isolate customizations made to a software program, but are not so limited. As an example, if customizations are performed by a system integrator, the more XML-based meta-data and visual toolset(s) provided make it easier to merge and integrate changes, especially during maintenance and upgrade operations. Additionally, any customizations made available to end users may be configured using XML-based meta-data which makes it easier to make and integrate the customizations during maintenance and upgrade operations.

An example illustrates aspects described herein. A developer would like to build a business application, using a development application that is configured to isolate one or more customizations made by the developer. The development application (e.g. VISUAL STUDIO) is an advanced integrated development environment that allows users to create/develop programs, web sites, web applications, web services, etc. Using the development application, the developer can use related libraries to compile one or more declarative models. Once compiled, the developer has access to different schemas, work flows, a user interface, basic samples and templates, forms, etc. The developer can use the user interface to customize a form for example. As described above, the customizations are isolated and persist from version to version. Moreover, the developer can make customizations using the same development tools that were used to develop the development application.

Exemplary Operating Environment

Figure 5:
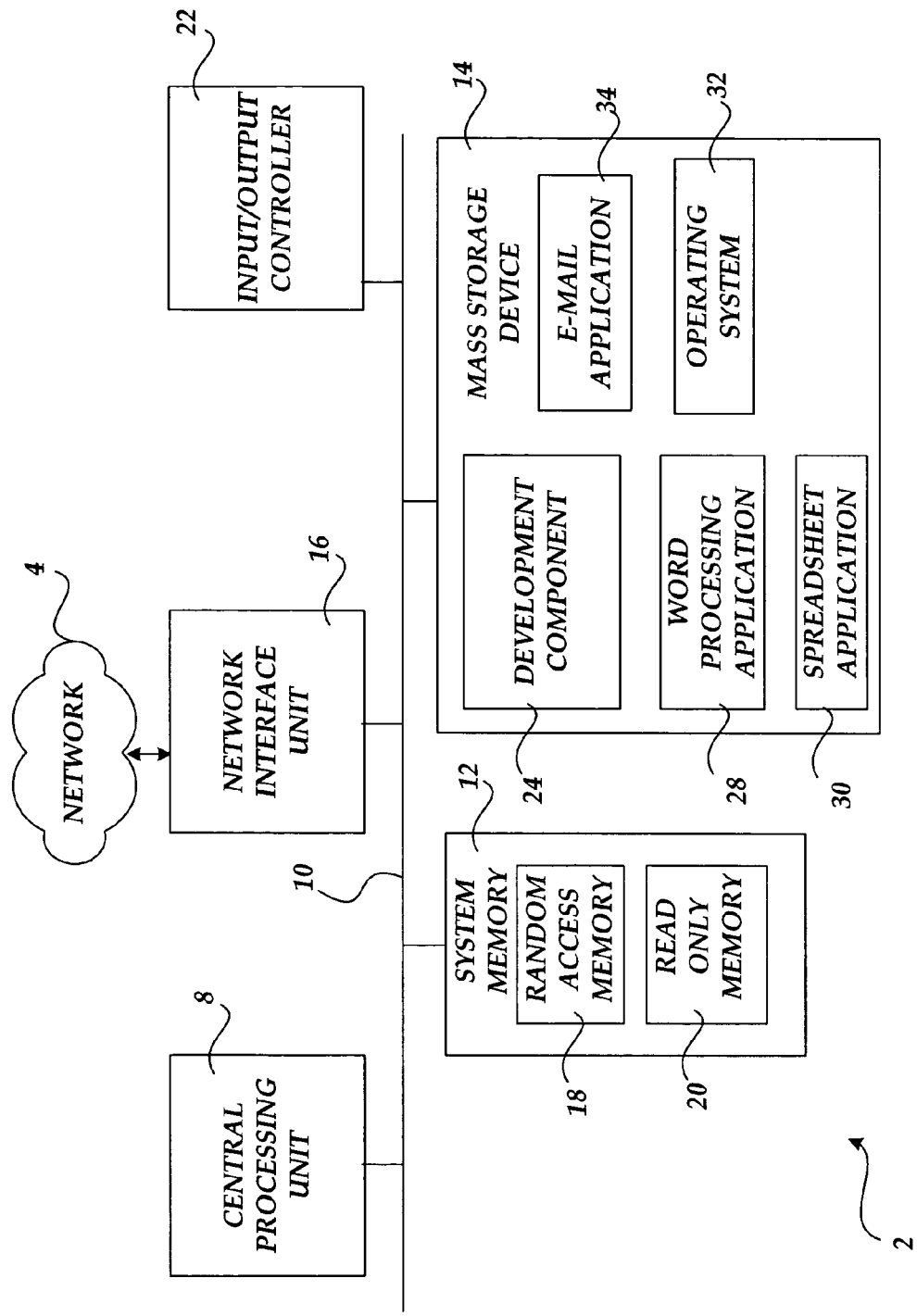
FIG. 5 is a block diagram illustrating a computing environment for implementation of various embodiments described herein.

Referring now to FIG. 5, the following discussion is intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 5, an illustrative operating environment for embodiments of the invention will be described. As shown in FIG. 5, computer 2 comprises a general purpose desktop, laptop, handheld, or other type of computer capable of executing one or more application programs. In particular, according to the various embodiments of the invention, the computer 2 is operative to execute a development component 24, as described in detail above. The computer 2 includes at least one central processing unit 8 ("CPU"), a system memory 12, including a random access memory 18 ("RAM") and a read-only memory ("ROM") 20, and a system bus 10 that couples the memory to the CPU 8. A basic input/output system containing the basic routines that help to transfer information between elements within the computer, such as during startup, is stored in the ROM 20. The computer 2 further includes a mass storage device 14 for storing an operating system 32, application programs, and other program modules.

The mass storage device 14 is connected to the CPU 8 through a mass storage controller (not shown) connected to the bus 10. The mass storage device 14 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed or utilized by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

According to various embodiments of the invention, the computer 2 may operate in a networked environment using logical connections to remote computers through a network 4, such as a local network, the Internet, etc. for example. The computer 2 may connect to the network 4 through a network interface unit 16 connected to the bus 10. It should be appreciated that the network interface unit 16 may also be utilized to connect to other types of networks and remote computing systems. The computer 2 may also include an input/output controller 22 for receiving and processing input from a number of other devices, including a keyboard, mouse, etc. (not shown). Similarly, an input/output controller 22 may provide output to a display screen, a printer, or other type of output device.

As mentioned briefly above, a number of program modules and data files may be stored in the mass storage device 14 and RAM 18 of the computer 2, including an operating system 32 suitable for controlling the operation of a networked personal computer, such as the WINDOWS XP operating system from MICROSOFT CORPORATION of Redmond, Wash. The mass storage device 14 and RAM 18 may also store one or more program modules. In particular, the mass storage device 14 and the RAM 18 may store application programs, such as a word processing application 28, a spreadsheet application 30, e-mail application 34, drawing application, etc.

It should be appreciated that various embodiments of the present invention can be implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as recited within the claims set forth herein.

Although the invention has been described in connection with various exemplary embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

We claim:

1. A computer-readable storage medium including executable instructions which, when executed, manage changes in code by:

providing a development tool and declarative model to use in a computing environment used in part to preserve a user experience using aspects of imperative code and declarative code, wherein the declarative code and associated meta-data are isolated rather than being integrated with assembled code;

implementing one or more customizations using the declarative code;

isolating the one or more customizations from the imperative code to provide one or more isolated customizations to locate and re-apply when managing aspects of the code from version to version, including isolating details of sources in a data pipeline component from a data source component using a first fixed contract via a first communication channel, and isolating details of sources in the data source component from a user interface component data using a second fixed contract via second communication channel as part of preserving the one or more isolated customizations;

persisting the one or more isolated customizations when managing the aspects of the code using the isolated customizations such that a user is not required to re-engineer the one or more customizations from version to version; and configuring the development tool to allow modifications to the code to provide a tailored customization when executing the instructions.

2. The computer-readable storage medium of claim 1, wherein the instructions, when executed, manage changes in code of a software package by persisting the one or more customizations in an update to the software package including merging the one or more isolated customizations with the update, the storage medium including one or more resource files, one or more shipping resource files, a run-times portion, and a shipping run-times portion.

3. The computer-readable storage medium of claim 1, wherein the instructions, when executed, manage changes in code of a software package by isolating meta-data associated with the one or more customizations.

4. The computer-readable storage medium of claim 3, wherein the instructions, when executed, manage changes in code of the software package by merging the meta-data associated with the one or more customizations with meta-data of a new version of the software package.

5. The computer-readable storage medium of claim 1, wherein the instructions, when executed, manage changes in code of a software package by managing at least one of a customized file, a customized setting, and a customized preference.

6. The computer-readable storage medium of claim 1, wherein the instructions, when executed, manage changes in code by including a development tool with the code, wherein the development tool is configured to allow modifications to meta-data associated with the declarative code to provide the tailored customization.

7. The computer-readable storage medium of claim 1, wherein the instructions, when executed, manage changes in code by including the development tool with the code, wherein the development tool is configured to operate with different versions of the declarative code.

8. The computer-readable storage medium of claim 1, wherein the instructions, when executed, manage changes in code by comparing one or more coded differences associated with the one or more customizations with a prior version of the code.

9. The computer-readable storage medium of claim 8, wherein the instructions, when executed, manage changes in code by comparing the one or more coded differences associated with the one or more customizations with a new version of the code.

10. A system to manage code of a computing environment, the system includes at least one processor, comprising:
   a declarative model associated with declarative code having an associated meta-data structure, wherein the declarative code and the associated meta-data structure are isolated rather than being integrated with assembled code;
   an imperative model associated with imperative code that is isolated from the declarative code;
   a development component to make customizations to the associated meta-data structure of the declarative model, wherein the customizations are isolated from the imperative code as isolated customizations to locate and re-apply as part of managing aspects of the code and persist in subsequent code versions such that a user is not required to re-engineer the customizations from version to version;
   a data pipeline component, a data source component, and a user interface component associated with the code, wherein a first fixed contract is used to isolate details of sources in the data pipeline component from the data source component via a first communication channel, and a second fixed contract is used to isolate details of sources in the data source component from the user interface component via a second communication channel as part of preserving the isolated customizations; and
   a development tool configured to allow modifications to the code to provide a tailored customization when executing the code.

11. The system of claim 10, further comprising a data source component in communication with a data pipeline component and a user interface component.

12. The system of claim 10, further comprising a merge component to merge customizations made to the meta-data structure of the declarative model with other declarative code.

13. The system of claim 10, wherein the meta-data structure of the declarative model comprises XML-based meta-data.

14. The system of claim 10, wherein the system comprises a developer software program.

15. A method of managing code of a software program, the method comprising:
   using a computer system as part of providing a declarative model for using the software program in a computing environment including preserving a user experience with the software using aspects of imperative code and a declarative code structure, wherein the declarative code structure and associated meta-data are isolated rather than being integrated with assembled code;
   including standard development tools with the software program;
   using the standard development tools to make one or more customizations to the code of the software program; and
   isolating the one or more customizations using the declarative code structure to provide one or more isolated customizations to locate and re-apply when managing aspects of the code of the software program such that a user is not required to re-engineer customizations from version to version, including isolating details of sources in a data pipeline component from a data source component using a first fixed contract via a first communication channel, and isolating details of sources in the data source component from a user interface component data using a second fixed contract via a second communication channel as part of preserving the one or more isolated customizations; and
   configuring the standard development tools to allow modifications to the code of the software program to provide a tailored customization when executing the software program.

16. The method of claim 15, further comprising updating the code of the software program by merging the one or more isolated customizations with one or more updates.

17. The method of claim 16, further comprising updating the code of the software program by merging XML meta-data associated with the one or more isolated customizations, and making the one or more isolated customizations available in an updated software program.

18. The method of claim 15, further comprising using the standard development tools to persist customizations and make further customizations in different versions of the software program.

* * * * *